(12) United States Patent
Khoshnevisan et al.

(10) Patent No.: US 12,470,272 B2
(45) Date of Patent: Nov. 11, 2025

(54) CSI REPORT CONFIGURATION WITH MULTIPLE CSI REPORTS

(71) Applicant: QUALCOMM Incorporated, San Diego, CA (US)

(72) Inventors: Mostafa Khoshnevisan, San Diego, CA (US); Chenxi Hao, Beijing (CN); Yu Zhang, San Diego, CA (US); Xiaoxia Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 17/759,945

(22) PCT Filed: Mar. 2, 2020

(86) PCT No.: PCT/CN2020/077393
§ 371 (c)(1),
(2) Date: Aug. 2, 2022

(87) PCT Pub. No.: WO2021/174378
PCT Pub. Date: Sep. 10, 2021

(65) Prior Publication Data
US 2023/0120578 A1 Apr. 20, 2023

(51) Int. Cl.
*H04B 7/06* (2006.01)
*H04W 72/1268* (2023.01)
*H04W 72/566* (2023.01)

(52) U.S. Cl.
CPC ...... *H04B 7/0626* (2013.01); *H04W 72/1268* (2013.01); *H04W 72/566* (2023.01)

(58) Field of Classification Search
CPC ..... H04B 7/0626; H04L 5/001; H04L 5/0057; H04L 5/0091; H04W 72/542; H04W 72/566; H04W 72/1268

(Continued)

(56) References Cited

U.S. PATENT DOCUMENTS

| 10,123,343 B2 | 11/2018 | Nazar et al. |
| 2012/0039252 A1* | 2/2012 | Damnjanovic ....... H04L 5/0057 370/328 |

(Continued)

FOREIGN PATENT DOCUMENTS

| CN | 110034852 A | 7/2019 |
| CN | 110663214 A | 1/2020 |

(Continued)

OTHER PUBLICATIONS

International Search Report and Written Opinion—PCT/CN2020/077393—ISAEPO—Dec. 3, 2020.

(Continued)

*Primary Examiner* — Harun Chowdhury
(74) *Attorney, Agent, or Firm* — Harrity & Harrity, LLP \ Qualcomm (57) ABSTRACT

Various aspects of the present disclosure generally relate to wireless communication. In some aspects, a user equipment (UE) may receive a channel state information (CSI) report configuration that includes configuration information associated with multiple CSI reports. The UE may generate a CSI report message in which the multiple CSI reports are separately encoded and ordered based at least in part on one or more rules. In some aspects, the CSI report message may be generated for transmission on one or more of a physical uplink shared channel (PUSCH) or a physical uplink control channel (PUCCH). Numerous other aspects are provided.

28 Claims, 6 Drawing Sheets

(58) Field of Classification Search
USPC .................................. 370/252, 328, 329
See application file for complete search history.

(56) References Cited

U.S. PATENT DOCUMENTS

| | | | |
|---|---|---|---|
| 2014/0169204 A1 | 6/2014 | Cheng et al. | |
| 2016/0211903 A1* | 7/2016 | Damnjanovic | H04B 7/0626 |
| 2018/0227031 A1 | 8/2018 | Guo et al. | |
| 2019/0149216 A1 | 5/2019 | Tsai et al. | |
| 2021/0167830 A1* | 6/2021 | Song | H04L 5/0091 |
| 2024/0097762 A1* | 3/2024 | Kyung | H04B 7/0626 |

FOREIGN PATENT DOCUMENTS

| | | |
|---|---|---|
| EP | 3547584 A1 | 10/2019 |
| WO | 2019069296 A1 | 4/2019 |
| WO | 2019192013 | 10/2019 |

OTHER PUBLICATIONS

OPPO: "Remaining Issues on CSI Reporting", 3GPP Draft, 3GPP TSG RAN WG1 Meeting #93, R1-1806848, Busan, Korea, May 21-May 25, 2018, May 25, 2018 (May 25, 2018), 7 Pages.
Nokia, et al., "Remaining Details for CSI Reporting on PUCCH", 3GPP TSG RAN WG1 Meeting #92, R1-1802285, 3rd Generation Partnership Project, Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 16, 2018, XP051397469, 3 pages.
Supplementary European Search Report—EP20922631—Search Authority—Munich—Oct. 30, 2023.

* cited by examiner

CSI REPORT CONFIGURATION WITH MULTIPLE CSI REPORTS

CROSS-REFERENCE TO RELATED APPLICATION

This application is a 371 national stage of Patent Cooperation Treaty (PCT) Application No. PCT/CN2020/077393 filed on Mar. 2, 2020, entitled "CSI REPORT CONFIGURATION WITH MULTIPLE CSI REPORTS," which is hereby expressly incorporated by reference herein.

FIELD OF THE DISCLOSURE

Aspects of the present disclosure generally relate to wireless communication and to techniques and apparatuses for providing a channel state information (CSI) report configuration with multiple CSI reports.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving a channel state information (CSI) report configuration that includes configuration information associated with multiple CSI reports; and generating a CSI report message in which the multiple CSI reports are separately encoded and ordered based at least in part on one or more rules, wherein the CSI report message is generated for transmission on one or more of a physical uplink shared channel (PUSCH) or a physical uplink control channel (PUCCH).

In some aspects, a UE for wireless communication may include a memory and one or more processors operatively coupled to the memory. The memory and the one or more processors may be configured to: receive a CSI report configuration that includes configuration information associated with multiple CSI reports; and generate a CSI report message in which the multiple CSI reports are separately encoded and ordered based at least in part on one or more rules, wherein the CSI report message is generated for transmission on one or more of a PUSCH or a PUCCH.

In some aspects, a non-transitory computer-readable medium may store one or more instructions for wireless communication. The one or more instructions, when executed by one or more processors of a UE, may cause the one or more processors to: receive a CSI report configuration that includes configuration information associated with multiple CSI reports; and generate a CSI report message in which the multiple CSI reports are separately encoded and ordered based at least in part on one or more rules, wherein the CSI report message is generated for transmission on one or more of a PUSCH or a PUCCH.

In some aspects, an apparatus for wireless communication may include: means for receiving a CSI report configuration that includes configuration information associated with multiple CSI reports; and means for generating a CSI report message in which the multiple CSI reports are separately encoded and ordered based at least in part on one or more rules, wherein the CSI report message is generated for transmission on one or more of a PUSCH or a PUCCH.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
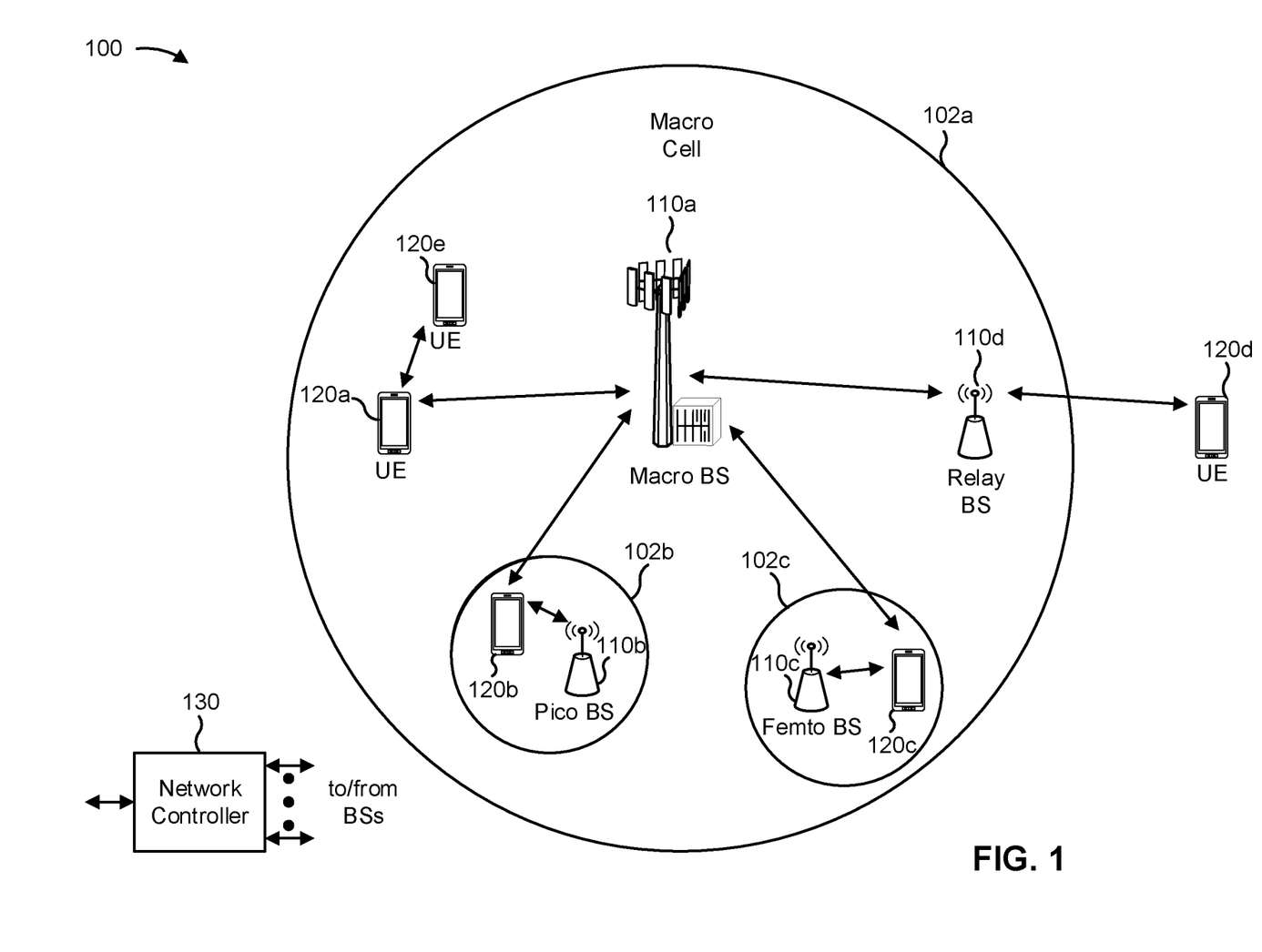
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
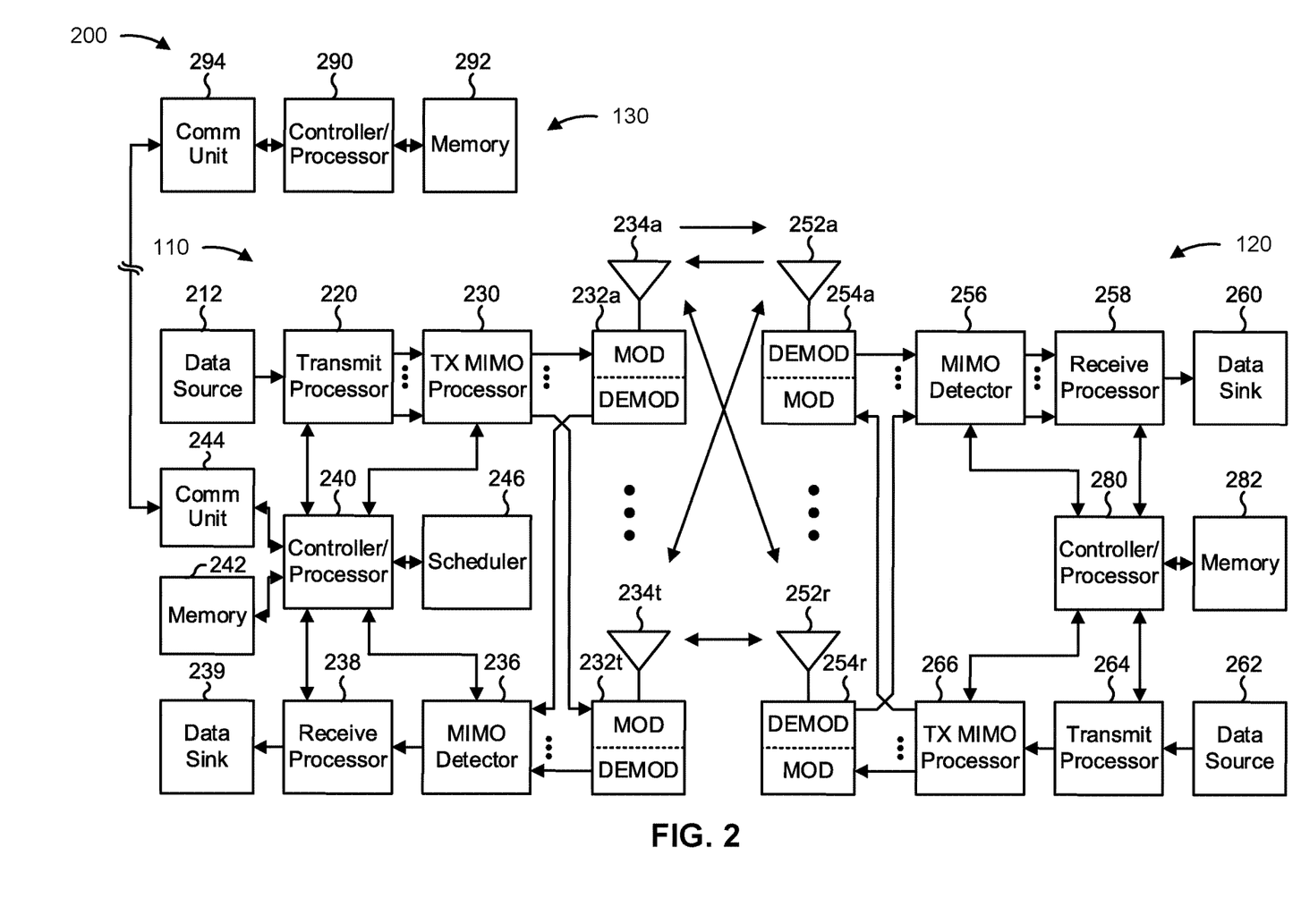
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a channel state information (CSI) report configuration with multiple CSI reports, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 600 of FIG. 5 and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving a CSI report configuration that includes configuration information associated with multiple CSI reports, means for generating a CSI report message in which the multiple CSI reports are separately encoded and ordered based at least in part on one or more rules, wherein the CSI report message is generated for transmission on one or more of a PUSCH or a PUCCH, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
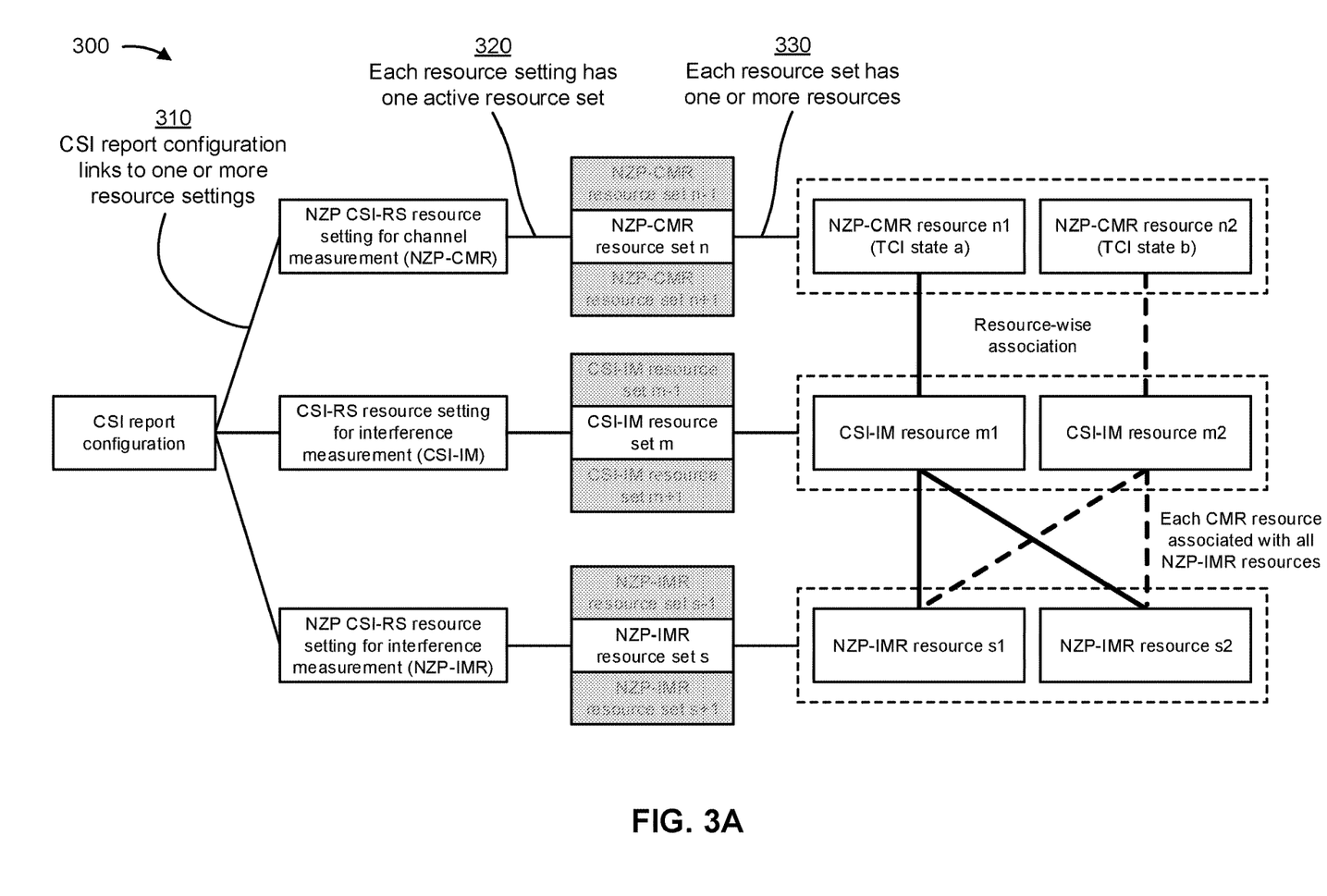
FIGS. 3A-3B are diagrams illustrating one or more examples of a channel state information (CSI) framework in which a CSI report configuration corresponds to one CSI report, in accordance with various aspects of the present disclosure.
Figure 3B:
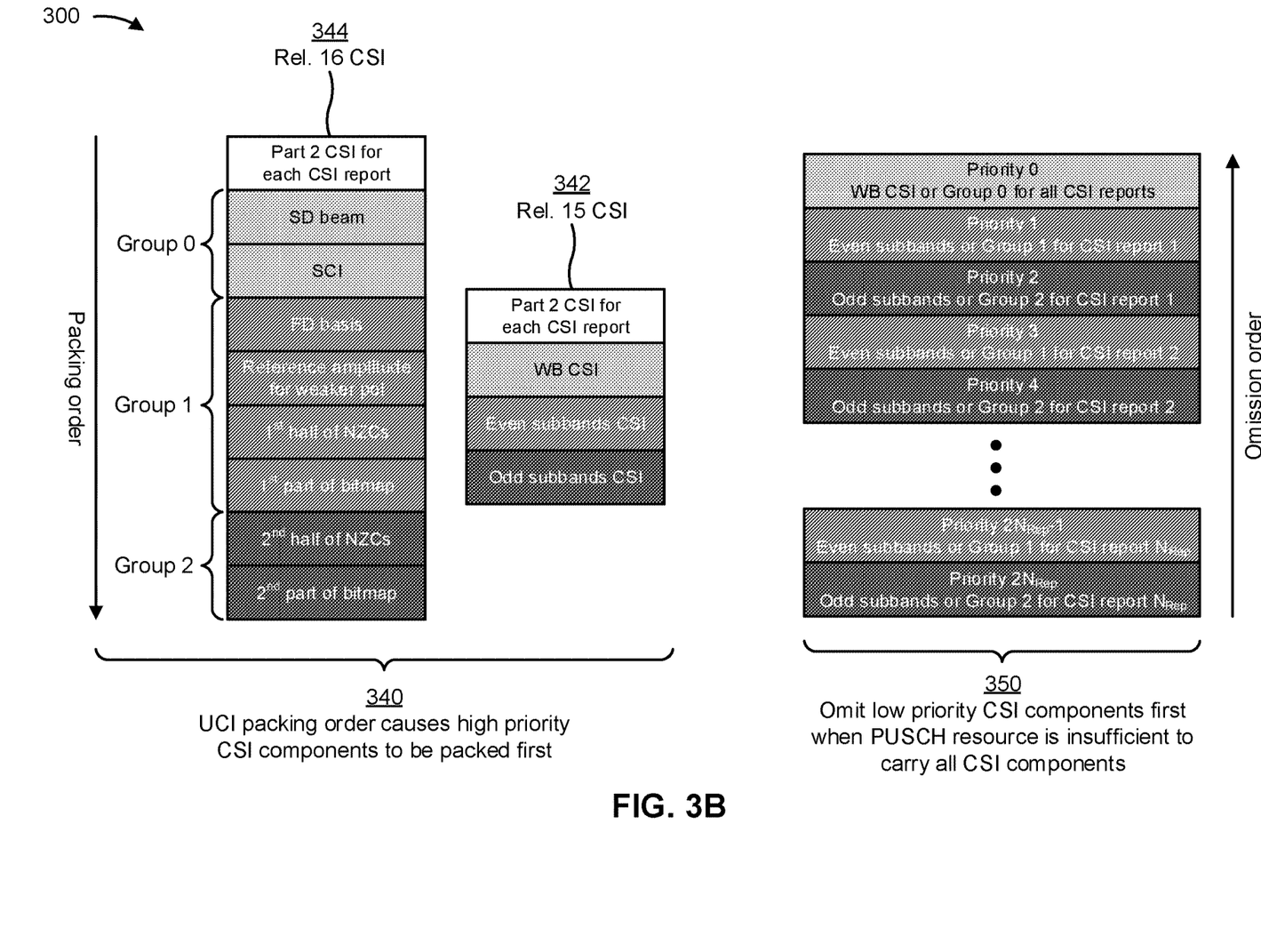

FIGS. 3A-3B are diagrams illustrating one or more examples 300 of a CSI framework in which a CSI report configuration corresponds to one CSI report, in accordance with various aspects of the present disclosure.

In a wireless network, such as an LTE network, an NR network, and/or the like, a transmitter (e.g., a base station) may transmit a reference signal, such as a channel state information reference signal (CSI-RS) to trigger a channel state information (CSI) report from a receiver (e.g., a UE). For example, the receiver may obtain one or more measurements from the reference signal to determine the CSI quantities to report, which may include a channel quality indicator (CQI), a precoding matrix indicator (PMI), a precoding type indicator (PTI), a rank indication (RI), and/or the like. Accordingly, the CSI report may provide the transmitter with information related to conditions associated with a wireless channel, which may represent a combined effect of scattering, fading, power decay with distance, and/or the like as a signal propagates in a path from the transmitter to the receiver. The transmitter can use the CSI report to select and/or adapt communication parameters (e.g., precoding, MCS selection, beam selection, and/or the like) to enhance throughput, reliability, and/or the like. For example, when the CSI report indicates that the wireless channel has a low quality, the transmitter may select a more conservative or robust rate to ensure that data is successfully delivered. When the CSI report indicates that the wireless channel has a high quality, the transmitter may select a less conservative or robust (e.g., faster) rate to improve throughput and take advantage of the high quality wireless channel.

In general, the CSI report provided from the receiver to the transmitter is indicated to the receiver in a CSI report configuration, which may configure a periodic, semi-persistent, or aperiodic CSI report via higher-layer signaling (e.g., radio resource control (RRC) signaling), and subsequent lower-layer signaling (e.g., a medium access control (MAC) control element (MAC-CE) or downlink control information (DCI)) may trigger the CSI report (e.g., in the case of an aperiodic CSI report, as described below). For example, as shown in FIG. 3A, and by reference number 310, a CSI report configuration may link to one or more resource settings that are further associated with a set of resources to be used to obtain the CSI quantities to be included in the CSI report. For example, as shown, the CSI report configuration may link to one resource setting (e.g., a non-zero power (NZP) CSI-RS resource setting for channel measurement (NZP-CMR) without a dedicated interference measurement resource), may link to two resource settings (e.g., the NZP-CMR resource setting and a CSI-RS resource setting for interference measurement (CSI-IM), the NZP-CMR resource setting and an NZP CSI-RS resource setting for interference measurement (NZP-IMR), and/or the like), may link to three resource settings (e.g., the NZP-CMR resource setting, the CSI-IM resource setting, and the NZP-IMR resource setting), and/or the like.

As further shown in FIG. 3A, and by reference number 320, each resource setting can include multiple resource sets, only one of which is active in a particular CSI report configuration corresponding to one CSI report (e.g., in FIG. 3A, the grayed out resource sets are inactive in the corresponding CSI report configuration). As further shown in FIG. 3A, and by reference number 330, each resource set has one or more resources. For example, in FIG. 3A, NZP-CMR resource set n includes NZP-CMR resource n1 and NZP-CMR resource n2, CSI-IM resource set m includes CSI-IM resource m1 and CSI-IM resource m2, and NZP-IMR resource set s includes NZP-IMR resource s1 and NZP-IMR resource s2. Furthermore, in some aspects, different resources included in a particular NZP-CMR resource set may be associated with different transmission configuration indication (TCI) states (e.g., to define one or more quasi-co-location (QCL) relationships for one or more downlink reference signals associated with the corresponding resource). For example, in FIG. 3A, NZP-CMR resource n1 is associated with a first TCI state (TCI state a) and NZP-CMR resource n2 is associated with a second TCI state (TCI state b). Furthermore, as shown in FIG. 3A, NZP-CMR resources may have a one-to-one (resource-wise) association with a CSI-IM resource, each of which has a one-to-many mapping to all active NZP-IMR resources within the CSI report configuration. In this way, each NZP-CMR resource is associated with all of the active NZP-IMR resources in the CSI report configuration collectively.

In some aspects, when a receiver (e.g., a UE) is provided with a CSI report configuration, such as the CSI report configuration illustrated in FIG. 3A, the receiver may identify the active resource set(s) among the resource setting(s) linked to the CSI report configuration, and may provide a transmitter (e.g., a base station) one CSI report that includes the best (e.g., most reliable, most accurate, highest quality, and/or the like) CSI measurements obtained from the corresponding channel measurement resources and/or interference measurement resources. For example, each channel measurement resource and/or interference measurement resource may correspond to one CSI hypothesis, and the receiver may select one NZP-CMR resource corresponding to the best CSI hypothesis to be reported (e.g., the NZP-CMR resource with the best CQI, the best PMI, and/or the like). In cases where the active resource sets include multiple associated resources, because the receiver is selecting the resource to be reported, the CSI report provided by the receiver may include a CSI resource indicator (CRI) associated with the selected resource such that the transmitter receiving the CSI report can determine the resource associated with the reported CSI). Furthermore, as described above, a CSI report configuration that is specified according to the CSI framework shown in FIG. 3A corresponds to one CSI report to be provided from a receiver to a transmitter.

In some aspects, as described above, a CSI report to be provided from a receiver to a transmitter may be associated with a periodic configuration, a semi-persistent configuration on a physical uplink shared channel (PUSCH), a semi-persistent configuration on a physical uplink control channel (PUCCH), or an aperiodic configuration. For example, in a periodic configuration, the CSI report may be configured via higher-layer (e.g., RRC) signaling, and the receiver may subsequently provide a CSI report to a transmitter based at least in part on a downlink reference signal (e.g., a CSI-RS) transmitted by the transmitter on a periodic basis. For a semi-persistent configuration on a PUSCH and/or PUCCH, the CSI report may be similarly be configured via higher-layer signaling, and subsequent dynamic signaling (e.g., a MAC-CE and/or DCI may trigger the semi-persistent CSI report, which then generally follows a similar cycle of periodic reference signal transmission and CSI report transmission. In the case of an aperiodic CSI report, which generally has a higher priority than a semi-persistent or periodic CSI report, the aperiodic CSI report is typically triggered on a PUSCH via an uplink DCI format that schedules the PUSCH.

For example, in some aspects, higher-layer (e.g., RRC) signaling can be used to configure a list including up to 128 aperiodic trigger states (e.g., using an CSI-AperiodicTriggerStateList parameter), and each aperiodic trigger state in the list may be linked to one or more (up to a maximum of sixteen) CSI report settings. For example, each CSI report setting may be linked to an aperiodic trigger state through an identifier (e.g., a CSI-ReportConfigId) in which one NZP-CMR resource set is configured and one or more interference measurement resource sets (e.g., a CSI-IM and/or NZP-IMR) may optionally be further configured. As described above with reference to FIG. 3A, the NZP-CMR resource set may include one or more CSI-RS (or CMR) resources, and a TCI state may be indicated for each CSI-RS (or CMR) resource as part of the aperiodic trigger state configuration. In some aspects, lower-layer signaling can then be used to dynamically trigger one of the aperiodic trigger states in the list. For example, in some aspects, if a CSI request field in an uplink DCI format has N bits, a MAC-CE may activate a subset of the aperiodic trigger states in the list that includes $2^N-1$ trigger states. For example, the CSI request field may include all zeros to indicate that no aperiodic CSI reports are triggered, whereby the MAC-CE may indicate $2^N-1$ codepoints that are mapped to different aperiodic trigger states in the list (e.g., up to a maximum of 63 codepoints for N=6). The CSI request field in the uplink DCI format can dynamically indicate one aperiodic trigger state to trigger an aperiodic CSI report.

Accordingly, in the case of aperiodic CSI reporting, multiple aperiodic CSI reports can be triggered on a PUSCH. For example, the following table is an example of different values that may be provided in the CSI request field of the uplink DCI format when sixty-three (63) trigger states are in the subset selected by the MAC-CE.

TABLE 1

Example Trigger States After MAC-CE Subset Selection

| CSI request field value | First associated CSI report configuration | Second associated CSI report configuration | ... |
|---|---|---|---|
| 1 | CSI-ReportConfigId; resourceSet in the report config; {TCI state 1, TCI state 2, ...} for the CSI-RS resources in the resourceSet | — | — |
| ... | ... | ... | ... |
| 63 | CSI-ReportConfigId; resourceSet in the report config; {TCI state 1, TCI state 2, ...} for the CSI-RS resources in the resourceSet | CSI-ReportConfigId; resourceSet in the report config; {TCI state 1, TCI state 2, ...} for the CSI-RS resources in the resourceSet | ... |

Accordingly, in the example provided in the table above, if the value of the CSI request field is one (1), one aperiodic CSI report is multiplexed on a PUSCH. In this case, the one aperiodic CSI report corresponds to the best hypothesis in the resource set, where each CSI-RS resource in the resource set corresponds to one hypothesis. Furthermore, as shown in the table above, two CSI reports are multiplexed on the PUSCH if the value of the CSI request field is sixty-three (63). Accordingly, as shown above, one CSI report configuration corresponds to one CSI report, whereby multiple CSI report configurations have to be triggered in order to trigger multiple corresponding CSI reports. Furthermore, although the foregoing procedure has been described in context with aperiodic CSI report, a similar procedure may be applied for semi-persistent CSI reporting on a PUSCH. For example, DCI may activate semi-persistent CSI reporting, and the CSI request field in the DCI may indicate the trigger state associated with the semi-persistent CSI report configuration(s) to be triggered.

In cases where multiple CSI reports are configured, the CSI reports may be associated with a priority value that can be used to determine a CSI Part2 omission order, uplink control information (UCI) multiplexing rules on a PUCCH in the case of multiple overlapping UCIs, and/or the like. For example, in some aspects, the priority value for a CSI report may be determined using the following function:

$$Pri_{iCSI}(y,k,c,s)=2 \cdot N_{cells} \cdot M_s \cdot y + N_{cells} \cdot M_s \cdot k + M_s \cdot c + s$$

where y has a value of 0 for an aperiodic CSI report to be carried on a PUSCH, 1 for a semi-persistent CSI report to be carried on a PUSCH, 2 for a semi-persistent CSI report to be carried on a PUCCH, or 3 for a periodic CSI report to be carried on a PUCCH. In this regard, an aperiodic CSI report has a highest priority, a semi-persistent CSI report to be carried on a PUSCH has a next highest priority, a semi-persistent CSI report to be carried on a PUCCH has a next highest priority, and a periodic CSI report to be carried on a PUCCH has a lowest priority. Furthermore, in the function provided above, k has a value of 0 for CSI reports carrying a Layer 1 (L1) reference signal received power (L1-RSRP) or L1 signal-to-interference-plus-noise ratio (L1-SINR) measurement or a value of 1 for CSI reports carrying other measurements, c is a serving cell index, N cells is a higher-layer (e.g., RRC) parameter representing a maximum number of serving cells, s is a CSI report configuration identifier (e.g., reportConfigID), and $M_s$ is a higher-layer (e.g., RRC) parameter representing a maximum number of CSI report configurations. Accordingly, in the foregoing function, different weights may be applied to the parameters y, k, c, and s (e.g., s is unweighted, c is weighted by $M_s$, k is weighted by $M_s$ and N cells, and y is weighted by $M_s$, $N_{cells}$, and a factor of 2) to determine the overall priority value of a CSI report, and a first CSI report may have priority over a second CSI report if the above function yields a priority value for the first CSI report lower than a priority value for the second CSI report.

In some aspects, as described above, the priority value associated with a CSI report can be used to determine a CSI Part2 omission order. For example, in some cases, CSI reporting may be divided into two parts, where the first part (Part1) of CSI feedback includes CSI quantities such as CQI, RI, and/or the like with a fixed payload size, and where the second part (Part2) includes additional (e.g., optional) CSI feedback that may have a variable payload size. Accordingly, in some cases, a PUSCH resource to be used to carry the Part2 CSI may be insufficient (e.g., where the Part2 CSI has a large payload size), in which case UCI omission may occur.

For example, as shown in FIG. 3B, and by reference number 340, Part2 CSI may be associated with a UCI packing order that causes high priority CSI components to be packed into a Part2 CSI payload first. For example, as shown by reference number 342, in 3GPP Release 15, the Part2 CSI may include wideband CSI with a highest priority, even subbands CSI with a next highest priority, and odd subbands CSI with a lowest priority. Additionally, or alternatively, as shown by reference number 344, in 3GPP Release 16, the Part2 CSI may be divided into groups, where Group 0 includes one or more CSI components with a highest priority, Group 1 includes one or more CSI components with a next highest priority, and Group 2 includes one or more CSI components with a lowest priority. Accordingly, when CSI reporting on a PUSCH includes two parts, the receiver (UE) may omit a portion of the Part2 CSI when the PUSCH resource is insufficient based on the payload size of the Part2 CSI. For example, as shown by reference number 350, low priority CSI components may be omitted first according to a UCI omission order when the PUSCH resource is insufficient to carry all the CSI components of the Part2 CSI.

In particular, starting from the lowest priority, the receiver may omit Part2 CSI components from the Part2 CSI to be transmitted until the remaining Part2 CSI components have a payload size that can be carried using the allocated PUSCH resource. For example, as shown in FIG. 3B, $N_{Rep}$ is a number of CSI reports configured to be carried on the PUSCH, priority 0 is a highest priority, priority $2N_{Rep}$ is a lowest priority, and CSI report n corresponds to a CSI report with the nth smallest priority value as determined using the $Pri_{iCSI}$ (y, k, c, s) function provided above. For example, in the case of Release 15 CSI, odd subbands for a lowest priority CSI report may have a lowest priority of $2N_{Rep}$, even subbands for the lowest priority CSI report may have a next lowest priority of $2N_{Rep}-1$, and/or the like. Additionally, or alternatively, in the case of Release 16 CSI, Group 2 CSI for a lowest priority CSI report may have the lowest priority of $2N_{Rep}$, Group 1 CSI for the lowest priority CSI report may have a next lowest priority of $2N_{Rep}-1$, and/or the like. In either case, the highest priority CSI (e.g., wideband CSI for Release 15 CSI or Group 0 CSI for Release 16 CSI) for all CSI reports may have the highest priority of 0 and is omitted last.

As indicated above, FIGS. 3A-3B are provided as one or more examples. Other examples may differ from what is described with regard to FIGS. 3A-3B.

As discussed above, one CSI report configuration typically corresponds to one CSI report. However, in some cases, a wireless network may enable multiple CSI reports to be configured in a single CSI report configuration (e.g., to enable non-coherent joint transmission (NCJT) CSI reporting for multi-TRP communication). For example, if a CSI report configuration indicates multiple hypotheses corresponding to different NZP-CMR resources, CSI-IM resources, NZP-IMR resources, and/or the like, enabling multiple CSI reports to be configured in a single CSI report configuration may allow the UE to transmit a first CSI report including one hypothesis corresponding to a single TRP and a second CSI report including one hypothesis corresponding to multiple TRPs, in which case the second CSI report becomes a multi-TRP report. In some cases, multiple CSI reports can be configured per CSI report configuration by allowing multiple hypotheses within one CSI report configuration (e.g., as shown in FIG. 3A) to be grouped into multiple hypothesis groups, and the UE may then report the best CSI per hypothesis group. For example, a first CSI report may correspond to the best single-TCI state hypothesis, and a second CSI report may correspond to the best multi-TCI state hypothesis. However, in cases where one CSI report configuration corresponds to multiple CSI reports, there are various unresolved issues with respect to how the multiple CSI reports are to be transmitted. For example, the priority function $Pri_{iCSI}$(y, k, c, s) does not include any dimensions to differentiate multiple CSI reports that are specified in the same CSI report configuration such that the values of (y, k, c, s) are the same for all the CSI reports. Furthermore, because the omission order shown in FIG. 3B is based at least in part on relative priorities of different CSI reports, enabling multiple CSI reports in one CSI report configuration may impact UCI omission rules.

Some aspects described herein relate to techniques and apparatuses to provide CSI feedback from a receiver to a transmitter in cases where the transmitter configures multiple CSI reports for the receiver in one CSI report configuration. For example, when the receiver is configured with a CSI report configuration that corresponds to multiple CSI reports, the multiple CSI reports may be separately encoded, and may be ordered for transmission on a PUSCH or PUCCH according to one or more rules that may be explicitly indicated in the CSI report configuration, based at least in part on fixed rules that define relative ordering for different CSI reports, determined by the receiver based on a performance metric, and/or the like. Furthermore, in some aspects, different CSI reports that are enabled in the same CSI report configuration may have the same priority or different priorities that are determined according to the ordering rules, and the priority function $Pri_{iCSI}$ may include one or more terms to determine priorities of the multiple CSI reports with respect to CSI reports that are associated with other CSI report configurations. Accordingly, a Part2 CSI omission rule may take into account the priorities of the multiple CSI reports in determining an omission ordering for Part2 CSI when a PUSCH resource is insufficient to carry all of the Part2 CSI associated with the multiple CSI reports. In this way, the receiver may determine how to configure the multiple CSI reports for transmission, which may enable NCJT CSI reporting and/or other use cases where multiple CSI reports may be grouped together within one CSI report configuration.

Figure 4:
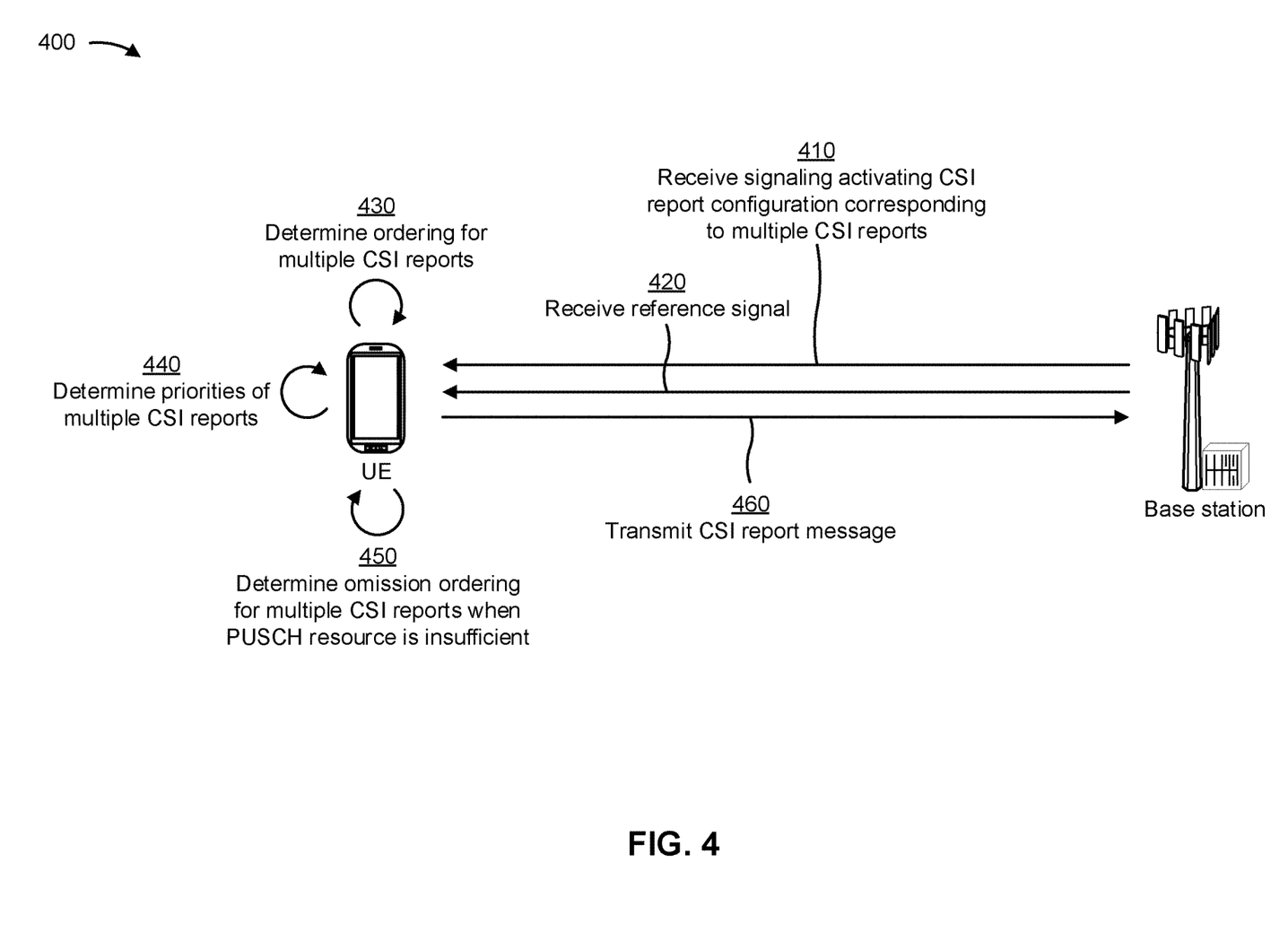
FIG. 4 is a diagram illustrating one or more examples of CSI reporting based at least in part on a CSI report configuration corresponding to multiple CSI reports, in accordance with various aspects of the present disclosure.

FIG. 4 is a diagram illustrating one or more examples 400 of CSI reporting based on a CSI report configuration corresponding to multiple CSI reports, in accordance with various aspects of the present disclosure. As shown in FIG. 4, example(s) 400 include a UE (e.g., UE 120) acting as a receiver to provide CSI feedback to a base station (e.g., base station 110) acting as a transmitter in a wireless network (e.g., wireless network 100).

As shown in FIG. 4, and by reference number 410, the base station may transmit, and the UE may receive, downlink signaling to activate a CSI report configuration that corresponds to multiple CSI reports. For example, as described above, higher-layer (e.g., RRC) signaling may be provided to semi-statically configure one or more CSI report configurations, and in the case of semi-persistent and/or aperiodic CSI reporting, lower-layer signaling can be used to activate or otherwise trigger one or more of the CSI report configurations. For example, in some aspects, the base station may transmit a MAC-CE to select a subset of the CSI report configurations and may subsequently transmit uplink DCI that includes a CSI request field with a codepoint to trigger one of the CSI report configurations in the selected subset. Furthermore, as described herein, at least one of the CSI report configurations that are activated may correspond to multiple CSI reports. For example, as described above, one technique to enable multiple CSI reports in one CSI report configuration may be to group multiple hypotheses in the CSI report configuration into multiple hypothesis groups that are associated with respective hypothesis group identifiers corresponding to different CSI reports. Furthermore, in some aspects, the downlink signaling received by the UE may activate multiple CSI report configurations, which includes at least one CSI report configuration corresponding to multiple CSI reports, and which may further include one or more CSI report configurations that correspond to one CSI report.

As further shown in FIG. 4, and by reference number 420, the base station may transmit, and the UE may receive, a downlink reference signal (e.g., a CSI-RS). For example, in some aspects, the downlink reference signal may be transmitted over one or more channel measurement resources (CMR) using a non-zero power (NZP). Furthermore, in some aspects, the downlink reference signal may be associated with one or more interference measurement resources. For example, the interference measurement resources may include a set of time and frequency resources in which the base station does not transmit a signal (e.g., the base station transmits with zero power in the set of time and frequency resources corresponding to the interference measurement resource(s)), whereby any signal power that the UE collects or otherwise measures in the interference measurement resources may be considered interference. Additionally, or alternatively, the interference measurement resources may include a set of time and frequency resources in which only the base station transmits the reference signal, in which case a signal measurement obtained from the reference signal transmitted on the interference measurement resources may be subtracted from signal power measured on the CMR such that a difference between the signal power measured on the interference measurement resources and the signal power measured on the CMR may be considered interference.

As further shown in FIG. 4, and by reference number 430, the UE may determine an ordering for the multiple CSI reports that are associated with one CSI report configuration. The UE may separately encode the multiple CSI reports, and the separately encoded CSI reports may be ordered (e.g., within a CSI report message) for transmission on a PUSCH or PUCCH according to one or more rules. For example, in some aspects, the multiple CSI reports may include multiple periodic CSI reports to be transmitted on a PUCCH, multiple semi-persistent CSI reports to be transmitted on the PUCCH, multiple semi-persistent CSI reports to be transmitted on a PUSCH, multiple aperiodic CSI reports to be transmitted on the PUSCH, and/or the like.

In some aspects, the one or more rules that indicate the ordering for the multiple CSI reports may be explicitly configured in the CSI report configuration. For example, as described above, the corresponding CSI report configuration may include multiple hypotheses that may be grouped into multiple hypothesis groups that are associated with respective hypothesis group identifiers corresponding to the different CSI reports. Accordingly, in one example, the ordering of the multiple CSI reports may be based at least in part on the order of the corresponding hypothesis group identifiers that are configured for each CSI report (e.g., from lowest to highest, from highest to lowest, and/or the like). Additionally, or alternatively, the one or more rules that indicate the ordering for the multiple CSI reports may include one or more fixed rules. For example, in some aspects, the fixed rules may indicate that a CSI report corresponding to a single TCI state (e.g., a single-TRP CSI report) is to be ordered first or before a CSI report that corresponds to multiple TCI states (e.g., an NCJT CSI report). Alternatively, the fixed rules may indicate that a CSI report that corresponds to multiple TCI states is to be ordered first or before a CSI report that corresponds to one TCI state. In another example, the fixed rules may indicate that the multiple CSI reports are to be ordered according to payload size (e.g., where multiple CSI reports have different payload sizes, a CSI report with a smallest or largest payload may be ordered first, and a CSI report with a largest or smallest payload may be ordered last). Additionally, or alternatively, the ordering for the multiple CSI reports may be determined according to one or more performance metrics (e.g., a CSI report with a highest CQI, spectral efficiency, and/or the like may be ordered first). In this case, because the ordering depends on the performance metrics obtained by the UE, which are unknown to the base station prior to receiving the CSI reports, the UE may include a CRI with each CSI report such that the base station can determine which CSI report corresponds to which hypothesis according to the CRI.

As further shown in FIG. 4, and by reference number 440, the UE may determine priorities of the multiple CSI reports. For example, as described herein, the UE may determine the priorities of the multiple CSI reports with respect to each other, and in cases where multiple CSI report configurations (each corresponding to one or more CSI reports) are enabled, the UE may further determine the priorities of the multiple CSI reports with respect to the other CSI report(s) associated with the other CSI report configuration(s). For example, in some aspects, multiple CSI reports that correspond to one CSI report configuration may have equal priorities, whereby the multiple CSI reports are all multiplexed and reported on a PUSCH or PUCCH or all dropped. Alternatively, in cases where the multiple CSI reports that correspond to one CSI report configuration have different priorities, the respective priorities may be determined according to the ordering rules described in further detail above.

Furthermore, in cases where one or more other CSI report configurations are enabled, the UE may determine the priorities of the multiple CSI reports associated with the same CSI report configuration with respect to the CSI report(s) associated with the other CSI report configuration(s) according to a priority function, $\text{Pri}_{iCSI}$ (y, k, c, s, i), where i represents a priority of a CSI report within the same CSI report configuration (e.g., i=0 or i=1 for the case of multiple CSI reports). Furthermore, in some aspects, the priority function may include a weighting parameter, $M_I$, which represents the maximum number of CSI reports within the same CSI report configuration (e.g., $M_I$=2 in the case of a CSI report configuration with a maximum of two CSI reports). Accordingly, in one example, the multiple CSI reports that are associated with the same CSI report configuration may either have a higher priority or a lower priority with respect to any other CSI reports, as shown in the following priority function:

$$\text{Pri}_{iCSI}(y,k,c,s,i)=2 \cdot N_{cells} \cdot M_s \cdot M_I \cdot y + N_{cells} \cdot M_s \cdot M_I \cdot k + M_s \cdot M_I \cdot c + s \cdot M_I + i$$

In another technique, the priorities of the multiple CSI reports may be determined according to an ordering of a CSI report within a CSI report configuration. For example, a CSI report associated with a particular CSI report configuration identifier that is ordered first may have a higher priority than any CSI report that is ordered second (or lower) for any CSI report configuration identifier, as shown in the following priority function:

$$\text{Pri}_{iCSI}(y,k,c,s,i)=4 \cdot 2 \cdot N_{cells} \cdot M_s \cdot i + 2 \cdot N_{cells} \cdot M_s \cdot y + N_{cells} \cdot M_s \cdot k + M_s \cdot c + s$$

In other techniques, the priority function may assign a relative weighting to the multiple CSI reports relative to other CSI reports that are associated with other CSI report configurations by varying a placement of the parameter i that represents the priority of a CSI report within the same CSI report configuration and the weighting parameter, $M_I$, as shown in the following examples:

$$\text{Pri}_{iCSI}(y,k,c,s,i)=M_I \cdot 2 \cdot N_{cells} \cdot M_s \cdot y + 2 \cdot N_{cells} \cdot M_s \cdot i \cdot N_{cells} \cdot M_s \cdot k + M_s \cdot c + s$$

$$\text{Pri}_{iCSI}(y,k,c,s,i)=2 \cdot M_I \cdot N_{cells} \cdot M_s \cdot y + M_I \cdot N_{cells} \cdot M_s \cdot k \cdot N_{cells} \cdot M_s \cdot i + M_s \cdot c + s$$

$$\text{Pri}_{iCSI}(y,k,c,s,i)=2 \cdot N_{cells} \cdot M_I \cdot M_s \cdot y + N_{cells} \cdot M_s \cdot k + M_I \cdot M_s \cdot c + M_s \cdot i + s$$

As further shown in FIG. 4, and by reference number 450, the UE may determine an omission ordering to be applied for the multiple CSI reports when the multiple CSI reports include Part2 CSI to be multiplexed for transmission on a PUSCH and the PUSCH resource is insufficient to carry all of the Part2 CSI.

For example, in cases where multiple CSI reports associated with the same CSI report configuration have equal priorities, $N_{Rep}$ may represent a quantity of CSI report configurations, whereby multiple CSI reports within the same CSI report configuration may be counted as one CSI report (e.g., contribute a value of one (1) towards $N_{Rep}$ and are not counted separately). Accordingly, in this case, if a portion of CSI for a CSI report configuration is omitted, the corresponding portion of CSI is omitted for all corresponding CSI reports within the CSI report configuration. Similarly, any portion(s) of CSI that are included in the PUSCH transmission may be included for all corresponding CSI reports within the same CSI report configuration. For example, if Part2 CSI for even subbands, odd subbands, Group 1 CSI, Group 2 CSI, and/or the like is omitted or included for one CSI report in a CSI report configuration, then the corresponding Part2 CSI is omitted or included for all CSI reports in the same CSI report configuration.

Alternatively, in cases where multiple CSI reports associated with the same CSI report configuration have different priorities, $N_{Rep}$ may represent a total quantity of CSI reports that are configured to be transmitted on the PUSCH, in which case multiple CSI reports within the same CSI report configuration may be counted separately (e.g., each CSI report contributes a value of one (1) towards $N_{Rep}$). Accordingly, in this case, $N_{Rep}$ is specified across different CSI report configurations including the CSI report configuration(s) with multiple CSI reports, and the omission ordering may be similar to the omission ordering shown in FIG. 3B, except that the priority for each CSI report is determined according to one of the variants described above for the priority function $\text{Pri}_{iCSI}$ (y, k, c, s, i).

As further shown in FIG. 4, and by reference number 460, the UE may transmit, and the base station may receive, a CSI report message in which the multiple CSI reports associated with the CSI report configuration are separately encoded and ordered based at least in part on the one or more rules described above. In some aspects, the CSI reports that are separately encoded and ordered for transmission may include periodic CSI reports transmitted on a PUCCH, semi-persistent CSI reports transmitted on a PUCCH, semi-persistent CSI reports transmitted on a PUSCH, aperiodic CSI reports transmitted on a PUSCH, and/or the like. Furthermore, in cases where the CSI reports include Part2 CSI to be transmitted on a PUSCH, any portion of the Part2 CSI that is omitted from the PUSCH transmission may be determined according to the priority and omission ordering rules described in more detail above.

As indicated above, FIG. 4 is provided as one or more examples. Other examples may differ from what is described with regard to FIG. 4.

Figure 5:
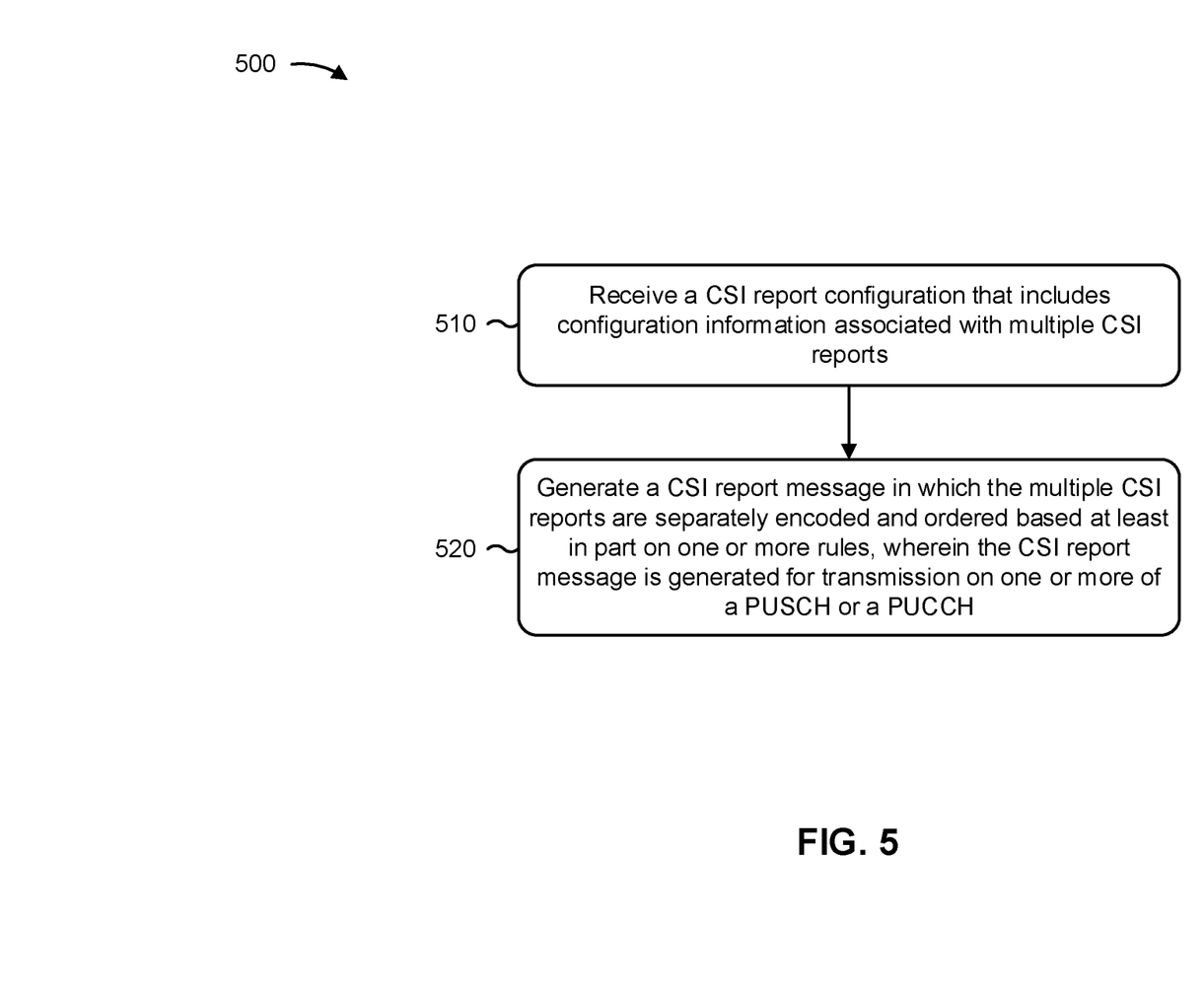
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations related to a CSI report configuration with multiple CSI reports.

As shown in FIG. 5, in some aspects, process 500 may include receiving a CSI report configuration that includes configuration information associated with multiple CSI reports (block 510). For example, the UE may receive (e.g., using antenna 252, DEMOD 254, MIMO detector 256, receive processor 258, controller/processor 280, memory 282, and/or the like) a CSI report configuration that includes configuration information associated with multiple CSI reports, as described above.

As further shown in FIG. 5, in some aspects, process 500 may include generating a CSI report message in which the multiple CSI reports are separately encoded and ordered based at least in part on one or more rules, wherein the CSI report message is generated for transmission on one or more of a PUSCH or a PUCCH (block 520). For example, the UE may generate (e.g., using controller/processor 280, transmit processor 264, TX MIMO processor 266, MOD 254, antenna 252, and/or the like) a CSI report message in which the multiple CSI reports are separately encoded and ordered based at least in part on one or more rules, as described above. In some aspects, the CSI report message is generated for transmission on one or more of a PUSCH or a PUCCH.

Process 500 may include additional aspects, such as any single aspect or any combination of aspects described below and/or in connection with one or more other processes described elsewhere herein.

In a first aspect, the CSI report configuration explicitly indicates the one or more rules to be used to order the multiple CSI reports.

In a second aspect, alone or in combination with the first aspect, the one or more rules indicate that the multiple CSI reports are to be ordered according to hypothesis group identifiers configured for the multiple CSI reports.

In a third aspect, alone or in combination with one or more of the first and second aspects, the one or more rules indicate that the multiple CSI reports are to be ordered according to a number of TCI states associated with each of the multiple CSI reports.

In a fourth aspect, alone or in combination with one or more of the first through third aspects, the one or more rules indicate that the multiple CSI reports are to be ordered according to payload sizes for the multiple CSI reports.

In a fifth aspect, alone or in combination with one or more of the first through fourth aspects, the one or more rules indicate that the multiple CSI reports are to be ordered according to values associated with one or more reporting parameters included in the multiple CSI reports.

In a sixth aspect, alone or in combination with one or more of the first through fifth aspects, the CSI report message includes a respective CRI associated with a corresponding one of the multiple CSI reports.

In a seventh aspect, alone or in combination with one or more of the first through sixth aspects, process 500 includes determining priorities of the multiple CSI reports with respect to each other and at least one CSI report associated with another CSI report configuration, and transmitting the CSI report message on the PUSCH or the PUCCH based at least in part on the priorities of the multiple CSI reports.

In an eighth aspect, alone or in combination with one or more of the first through seventh aspects, the multiple CSI reports are all included in or all omitted from the CSI report message transmitted on the PUSCH or the PUCCH based at least in part on the multiple CSI reports having equal priorities.

In a ninth aspect, alone or in combination with one or more of the first through eighth aspects, the priorities of the multiple CSI reports with respect to each other are based at least in part on the one or more rules for ordering the multiple CSI reports in the CSI report message.

In a tenth aspect, alone or in combination with one or more of the first through ninth aspects, the multiple CSI reports each have a higher priority or a lower priority with respect to the at least one CSI report associated with the other CSI report configuration.

In an eleventh aspect, alone or in combination with one or more of the first through tenth aspects, one of the multiple CSI reports that is ordered first in the CSI report message has a higher priority than the at least one CSI report associated with the other CSI report configuration based at least in part on determining that the at least one CSI report associated with the other CSI report configuration is not ordered first in the other CSI report configuration.

In a twelfth aspect, alone or in combination with one or more of the first through eleventh aspects, the priorities of the multiple CSI reports with respect to the at least one CSI report associated with the other CSI report configuration are based at least in part on a first parameter representing the priorities of the multiple CSI reports within the CSI report configuration and a second parameter representing a maximum number of CSI reports within the CSI report configuration.

In a thirteenth aspect, alone or in combination with one or more of the first through twelfth aspects, process 500 includes determining that a combined payload size for the multiple CSI reports exceeds a maximum size for multiplexing the multiple CSI reports on the PUSCH, and omitting at least a portion of CSI included in one or more of the multiple CSI reports from the CSI report message transmitted on the PUSCH based at least in part on respective priorities of the multiple CSI reports.

In a fourteenth aspect, alone or in combination with one or more of the first through thirteenth aspects, the portion of the CSI omitted from the CSI report message includes at least a portion of Part2 CSI.

In a fifteenth aspect, alone or in combination with one or more of the first through fourteenth aspects, corresponding portions of CSI included in each of the multiple CSI reports are omitted from the CSI report message based at least in part on the multiple CSI reports having equal priorities.

In a sixteenth aspect, alone or in combination with one or more of the first through fifteenth aspects, process 500 includes determining the portion of the CSI to be omitted from the CSI report message according to an omission ordering based at least in part on a total quantity of CSI reports that are configured to be transmitted and parameters representing the respective priorities of the CSI reports that are configured to be transmitted.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a channel state information (CSI) report configuration that includes configuration information associated with multiple CSI reports, the multiple CSI reports comprising a non-coherent joint transmission (NCJT) CSI report and a single-transmit receive point (TRP) CSI report; and
   generating a CSI report message in which the multiple CSI reports are separately encoded and ordered based at least in part on one or more rules, wherein the CSI report message is generated for transmission on one or more of a physical uplink shared channel (PUSCH) or a physical uplink control channel (PUCCH), wherein the one or more rules indicate that the NCJT CSI report is to be ordered before the single-TRP CSI report.

2. The method of claim 1, wherein the CSI report configuration explicitly indicates the one or more rules to be used to order the multiple CSI reports.

3. The method of claim 1, wherein the one or more rules indicate that the multiple CSI reports are to be ordered according to hypothesis group identifiers configured for the multiple CSI reports.

4. The method of claim 1, wherein the one or more rules indicate that the multiple CSI reports are to be ordered according to a number of transmission configuration indication (TCI) states associated with each of the multiple CSI reports.

5. The method of claim 1, wherein the one or more rules indicate that the multiple CSI reports are to be ordered according to payload sizes for the multiple CSI reports.

6. The method of claim 1, wherein the one or more rules indicate that the multiple CSI reports are to be ordered according to values associated with one or more reporting parameters included in the multiple CSI reports.

7. The method of claim 1, wherein the CSI report message includes a respective CSI resource indicator (CRI) associated with a corresponding one of the multiple CSI reports.

8. The method of claim 1, further comprising:
   determining priorities of the multiple CSI reports with respect to each other and at least one CSI report associated with another CSI report configuration; and
   transmitting the CSI report message on the PUSCH or the PUCCH based at least in part on the priorities of the multiple CSI reports.

9. The method of claim 8, wherein the multiple CSI reports are all included in or all omitted from the CSI report message transmitted on the PUSCH or the PUCCH based at least in part on the multiple CSI reports having equal priorities.

10. The method of claim 8, wherein the priorities of the multiple CSI reports with respect to each other are based at least in part on the one or more rules for ordering the multiple CSI reports in the CSI report message.

11. The method of claim 8, wherein the multiple CSI reports each have a higher priority or a lower priority with respect to the at least one CSI report associated with the other CSI report configuration.

12. The method of claim 8, wherein one of the multiple CSI reports that is ordered first in the CSI report message has a higher priority than the at least one CSI report associated with the other CSI report configuration based at least in part on determining that the at least one CSI report associated with the other CSI report configuration is not ordered first in the other CSI report configuration.

13. The method of claim 8, wherein the priorities of the multiple CSI reports with respect to the at least one CSI report associated with the other CSI report configuration are based at least in part on a first parameter representing the priorities of the multiple CSI reports within the CSI report configuration and a second parameter representing a maximum number of CSI reports within the CSI report configuration.

14. The method of claim 1, further comprising:
   determining that a combined payload size for the multiple CSI reports exceeds a maximum size for multiplexing the multiple CSI reports on the PUSCH; and omitting at least a portion of CSI included in one or more of the multiple CSI reports from the CSI report message transmitted on the PUSCH based at least in part on respective priorities of the multiple CSI reports.

15. The method of claim 14, wherein the portion of the CSI omitted from the CSI report message includes at least a portion of Part2 CSI.

16. The method of claim 14, wherein corresponding portions of CSI included in each of the multiple CSI reports are omitted from the CSI report message based at least in part on the multiple CSI reports having equal priorities.

17. The method of claim 14, further comprising:
    determining the portion of the CSI to be omitted from the CSI report message according to an omission ordering based at least in part on a total quantity of CSI reports that are configured to be transmitted and parameters representing the respective priorities of the CSI reports that are configured to be transmitted.

18. A user equipment (UE) for wireless communication, comprising:
    a memory; and
    one or more processors coupled to the memory, the memory and the one or more processors configured to:
        receive a channel state information (CSI) report configuration that includes configuration information associated with multiple CSI reports, the multiple CSI reports comprising a non-coherent joint transmission (NCJT) CSI report and a single-transmit receive point (TRP) CSI report; and
        generate a CSI report message in which the multiple CSI reports are separately encoded and ordered based at least in part on one or more rules, wherein the CSI report message is generated for transmission on one or more of a physical uplink shared channel (PUSCH) or a physical uplink control channel (PUCCH), wherein the one or more rules indicate that the NCJT CSI report is to be ordered before the single-TRP CSI report.

19. The UE of claim 18, wherein the CSI report configuration explicitly indicates the one or more rules to be used to order the multiple CSI reports.

20. The UE of claim 18, wherein the one or more rules indicate that the multiple CSI reports are to be ordered according to hypothesis group identifiers configured for the multiple CSI reports.

21. The UE of claim 18, wherein the one or more rules indicate that the multiple CSI reports are to be ordered according to a number of transmission configuration indication (TCI) states associated with each of the multiple CSI reports.

22. The UE of claim 18, wherein the one or more rules indicate that the multiple CSI reports are to be ordered according to payload sizes for the multiple CSI reports.

23. The UE of claim 18, wherein the one or more rules indicate that the multiple CSI reports are to be ordered according to values associated with one or more reporting parameters included in the multiple CSI reports.

24. The UE of claim 18, wherein the CSI report message includes a respective CSI resource indicator (CRI) associated with a corresponding one of the multiple CSI reports.

25. The UE of claim 18, wherein the memory and the one or more processors are further configured to:
    determine priorities of the multiple CSI reports with respect to each other and at least one CSI report associated with another CSI report configuration; and
    transmit the CSI report message on the PUSCH or the PUCCH based at least in part on the priorities of the multiple CSI reports.

26. The UE of claim 18, wherein the memory and the one or more processors are further configured to:
    determine that a combined payload size for the multiple CSI reports exceeds a maximum size for multiplexing the multiple CSI reports on the PUSCH; and
    omit at least a portion of CSI included in one or more of the multiple CSI reports from the CSI report message transmitted on the PUSCH based at least in part on respective priorities of the multiple CSI reports.

27. A non-transitory computer-readable medium storing one or more instructions for wireless communication, the one or more instructions comprising:
    one or more instructions that, when executed by one or more processors of a user equipment, cause the one or more processors to:
        receive a channel state information (CSI) report configuration that includes configuration information associated with multiple CSI reports, the multiple CSI reports comprising a non-coherent joint transmission (NCJT) CSI report and a single-transmit receive point (TRP) CSI report; and
        generate a CSI report message in which the multiple CSI reports are separately encoded and ordered based at least in part on one or more rules, wherein the CSI report message is generated for transmission on one or more of a physical uplink shared channel (PUSCH) or a physical uplink control channel (PUCCH), wherein the one or more rules indicate that the NCJT CSI report is to be ordered before the single-TRP CSI report.

28. An apparatus for wireless communication, comprising:
    means for receiving a channel state information (CSI) report configuration that includes configuration information associated with multiple CSI reports, the multiple CSI reports comprising a non-coherent joint transmission (NCJT) CSI report and a single-transmit receive point (TRP) CSI report; and
    means for generating a CSI report message in which the multiple CSI reports are separately encoded and ordered based at least in part on one or more rules, wherein the CSI report message is generated for transmission on one or more of a physical uplink shared channel (PUSCH) or a physical uplink control channel (PUCCH), wherein the one or more rules indicate that the NCJT CSI report is to be ordered before the single-TRP CSI report.

\* \* \* \* \*